United States Patent [19]

Nakazawa et al.

[11] Patent Number: 5,013,576

[45] Date of Patent: May 7, 1991

[54] GOURD POWDER COMPOSITION

[75] Inventors: Shinzo Nakazawa, Yuuki; Taro Tsukada, Kuki; Eiichi Suzuki, Ashikaga, all of Japan

[73] Assignee: Tokyo Tanabe Company, Limited, Tokyo, Japan

[21] Appl. No.: 395,334

[22] Filed: Aug. 17, 1989

[30] Foreign Application Priority Data

| Aug. 19, 1988 | [JP] | Japan | 63-204694 |
| Aug. 19, 1988 | [JP] | Japan | 63-204695 |
| Sep. 16, 1988 | [JP] | Japan | 63-229741 |

[51] Int. Cl.$^5$ ............................................. A23B 7/02
[52] U.S. Cl. ............................................. 426/640; 426/615
[58] Field of Search ............... 426/615, 640, 102, 285

[56] References Cited

U.S. PATENT DOCUMENTS

| 94,375 | 8/1869 | Ayer | 426/640 |
| 592,906 | 11/1897 | Gere | 426/640 |
| 1,273,072 | 7/1918 | Kuzmier | 426/615 |
| 3,518,343 | 6/1970 | Welsh | 426/591 |
| 3,518,344 | 6/1970 | Welsh | 426/591 |
| 3,597,231 | 8/1971 | Kane | 426/640 |
| 3,821,435 | 6/1974 | Blake | 426/615 |

FOREIGN PATENT DOCUMENTS

| 50-39133 | 12/1975 | Japan | 426/615 |
| 54-35230 | 3/1979 | Japan | 426/615 |
| 58-71849 | 4/1983 | Japan | 426/640 |
| 59-216563 | 12/1984 | Japan | 426/615 |
| 60-49757 | 3/1985 | Japan | 426/640 |
| 60-75250 | 4/1985 | Japan | 426/615 |
| 60-149356 | 8/1985 | Japan | 426/615 |
| 61-139359 | 6/1986 | Japan | 426/640 |
| 61-75769 | 4/1988 | Japan . | |
| 638323 | 12/1978 | U.S.S.R. . | |

OTHER PUBLICATIONS

American Heritage Dictionary, 1982, p. 569, Houghton Mifflen Co.
Talley 1966 Flavor and Storage Stability of Dehydrated Pumpkin Food Technology 20(10) 129.

Primary Examiner—Carolyn Paden
Attorney, Agent, or Firm—McGlew & Tuttle

[57] ABSTRACT

The composition comprises highly nutritious powder of gourd fruit which is available as solid nutritious food or nutritious beverages. The gourd powder composition contains the powder of gourd fruit, creaming syrup and/or L-ascorbic acid. The other nutritious ingredient can be added if necessary. When supplied as beverages, the foaming agents can be added thereto. The L-ascorbic acid is used mainly for the purpose of removing the grassy-smelling peculiar to the gourd. The creaming syrup is used to have the powder of gourd fruit deflocculated in the liquid. If the foaming agents are added thereto, the powder of gourd fruit is more easily deflocculated in the liquid and the cooling beverage like cream soda can be made.

18 Claims, No Drawings

GOURD POWDER COMPOSITION

BACKGROUND OF THE INVENTION

1. Field of the Invention

This invention relates to a gourd powder composition useful as nutritious foods and beverages.

2. Related Art Statement

The gourd is a highly nutritious food containing a well-balanced combination of sugar, fiber, protein, vitamins, calcium, pectin etc. and therefore has been eaten for food from old times. For instance, dried gourd shavings are called "kanpyo" and have long been used popularly as ingredients of "sushi" and other dishes. The dried gourd shavings have a water content of as high as 15 to 40% in themselves. Moreover, as it is highly nutritious, it is prone to gather bacteria and mold. Thus, 3 or 4 months after preparation, it suffers a change in properties such as color, odor, taste, etc. and quality, which requires much care for storage thereof accordingly.

In order to keep the quality of dried gourd shavings, there has been proposed a storage method in which they are fumigated with sulfur, bleached, and sterilized [Japanese Patent Publication no.21292/1982: "Food Industry", Vol.3, Book II, P.52 (1983)]. However, residue of sulfur is unavoidable in this method. As is regulated by the Food Sanitation Act of Japan (i.e., the amount of residual sulfur in terms of sulfur dioxide should not be greater than 5 g per kg of food), sulfur is harmful to human and therefore the presence of any residual sulfur is undesirable. Accordingly, dried gourd shavings need to be washed in water prior to eating and this causes most of the water-soluble nutrients (such as sugars, pectin, vitamins, etc.) present therein to be washed away.

In order to overcome the above-described disadvantages, there has been proposed a gourd food made without bleaching by fumigation with sulfur (unbleached dried gourd). This unbleached dried gourd food is quite safe from the viewpoint of food sanitation, highly nutritious, and has good keeping quality, so that it can be eaten for nourishing purpose. In addition, it is known that the dried gourd contains a plenty of food fiber (Japanese Patent Laid-open no.32458/1988).

Recently, it has been found that the dried gourd has an effect of promoting the growth of Bifidobacterium species selectively and markedly (Japanese Patent Application no.123761/1987).

Moreover, in recent years, food fibers have attracted public attention due to the fact that they have the effects of activating the reflex in the intestines and removing coprostasis and that few patients with rectum cancer have been found in the nations having plenty of food fibers.

As the dried gourd also has an effect of promoting the growth of Lactobacillus bifidus that depress the intestinal putrefaction and improve the diarrhea and the constipation, it is of more importance than other general food fibers.

The processed unbleached dried gourd is available in the form of ribbons, or is processed to powder or granule form; it, however, is grassy-smelling peculiar thereto and, due to its high content of sugars and protein, it tends to stick to teeth or teethridges, causing some onerousness in eating. For these reasons, the dried gourd in the form of ribbons has been eaten by cooking: the ones in the form of powder or granule by adding to "miso" soup or sprinkling on salad.

The present inventors, at first, tried to overcome the problems of being grassy-smelling and stickiness to teeth and teethridges using the following well-known additives; various spicery; acidity such as citric acid, malic acid, tartaric acid, etc.; sugars such as saccharose, lactose, mannitol, sorbitol, reduced maltose, etc.; antitack agents such as crystal cellulose, carboxymethylcellulose, carboxymethylcellulose calcium, etc.

However, the simultaneous solution of the two problems could not be achieved.

Furthermore, it is known that dried gourd has been eaten in the form of solid as in the case of unbleached dried gourd but until now it is not known that it is used as beverages. The reason for this is that when powder or granule of gourd is put in water or water-base beverages, non-water-soluble component is precipitated in a short time.

The present inventors, at first, tried to achieve deflocculation of the powder of gourd fruit using the following well-known additives to form beverages (1) a thickener such as sodium carboxymethylcellulose, hydroxypropyl cellulose, powder of gum arabic, starch, polyvinylpyrrolidone, etc.; and (2) a surfactant such as polyethylene glycol, glycerin fatty acid ester, stearic acid polyoxyl 40, saccharose fatty acid ester, etc.

However, using these well-known additives, beverages could not be obtained that were deflocculated stably for a long time when added in coffee, tea, boiling water and that also had a good taste.

SUMMARY OF THE INVENTION

It is, therefore, an object of the present invention to provide a composition of gourd fruit powder useful as a nutritious food.

It is another object of the present invention to provide a composition of gourd fruit powder useful as a nutritious beverage.

Above-described and other features and advantages of the present invention will become more apparent from following detailed description and examples.

The present invention provides a composition comprising powder of gourd fruit, creaming syrup and/or L-ascorbic acid (vitamin C).

When the gourd powder composition of the present invention is used as solid food, the essential ingredients are the powder of gourd fruit and L-ascorbic acid. The powder of gourd fruit of the present invention is the powder made from the above-mentioned unbleached dried gourd.

The powder of gourd fruit must have a standard plate viable cell count of not greater than $5 \times 10^3$ cells/g and must be negative in the tests for presence of E. coli and Salmonella species according to food sanitation standard. The L-ascorbic acid also must be safe from the viewpoint of food sanitation by choosing from the lists designated in food additive regulations or in the Japanese Pharmacopoeia.

The L-ascorbic acid is mixed to remove the grassysmell and avoid the stickiness to teeth and teethridges.

The preferable weight percentage of the L-ascorbic acid in the mixture to perform these aims is less than 30% of the total weight of the gourd powder composition and with a weight ratio of more than 0.8 parts of the former, i.e. L-ascorbic acid, to 1 part of the latter, i.e. the powder of gourd fruit.

Although the L-ascorbic acid has a strong acidity, when mixed with the powder of gourd fruit, the acidity is so masked that the good taste is not lost.

Moreover, the L-ascorbic acid is unstable in water, however, when mixed with the powder of gourd fruit, it acquires stability in water avoiding the loss in nutritious values thereof.

The weight adjusting agents are added so that the weight percentage of the L-ascorbic acid in the mixture may be less than 30 % of the total weight of the gourd powder composition.

The following weight adjusting agents are usable:

sugars; such as, fructose, sorbitol, mannitol, glucose, palatinose, saccharose, lactose, reduced maltose, etc., bifidus factor; such as, fructo-oligosaccharide, galacto-oligosaccharide, isomalto-oligosaccharide, "konnyaku" mannnan (mannnan from devil's tongue), soybean milk, etc., deflocculating agents; such as, polyethylene glycol, stearic acid, glycerin fatty acid ester, etc., surfactants; such as, stearic acid polyoxyl 40, polyoxyethylene hardening castor oil 60, propylene glycol, saccharose fatty acid ester etc., lubricants; such as, silicon dioxide, magnesium stearate, calcium stearate, talc, synthetic aluminum silicate, starches, silicone resins, etc., bonding agents; such as, gum arabic, polyvinylpyrrolidone, hydroxypropyl cellulose, etc., sweetenings; such as, D-alanine, L-alanine, glycine, stevioside, glycyrrhizin acid 2-potassium, glycyrrhizin acid, saccharin, saccharin sodium, L-aspartyl L-phenyl alanine methyl ester., spicery, coloring agents, preservatives and taste correcting agents. The kind and quantity to be added of the weight adjusting agents can be selected at discretion depending on the preparing method and the use of the gourd powder composition.

In addition to the above-mentioned nutritious ingredients, the following addition can be mixed with the gourd powder composition to replenish the nutrients;

taste increasing ingredients such as fish powder of mackerel, and yeast extract, etc., vitamins such as vitamin A, vitamin B1, B2, vitamin D., minerals such as potassium, calcium, magnesium, and iron, etc., restoratives such as liver hydrolyzate, taurine, royal jelly, etc., milk products such as skim milk, condensed yogurt, yogurt powder. Moreover, coffee cocoa, and tea powder can be mixed by choice.

Powder, granule, or tablets have been prepared from the gourd powder composition after mixing the powder of gourd fruit and the L-ascorbic acid in an appropriate proportion and after adding the weight adjusting agents thereto and the nutrient replenishing ingredients if necessary.

When the gourd powder composition is supplied as beverages, the essential ingredients are the powder of gourd fruit and creaming syrup.

The powder of gourd fruit, which means the powder of unbleached dried gourd fruit, is pulverized preferably to 42-mesh pass fine powder with an average grain diameter of over 80-mesh to achieve a better deflocculation in water or water-base beverages.

The creaming syrup is made of animal skim milk powder or whole milk powder, or of liquid condensation or dried powder of vegetable fat, mainly of corn (maize) etc.

The creaming syrup is mixed in order to have the powder of gourd fruit deflocculated stably in water or water-base beverages for a long time. The mixing ratio of the powder of gourd fruit and the creaming syrup (powder) is not greater than 1.1 parts of the former, i.e. the powder of gourd fruit to 1 part of the latter, i.e. the creaming syrup, in weight.

The mixing of the powder of gourd fruit in more than this ratio increases the smell peculiar to the gourd and spoils the flavor of beverages in themselves. When the condensed liquid creaming syrup is used, the mixing ratio of the powder of gourd fruit must be adjusted too, depending upon the condensation ratio.

If a foaming agent is added to the gourd powder composition, deflocculation of the powder of gourd fruit is improved further. As a foaming agent, organic acid such as citric acid, succinic acid, malic acid, and tartaric acid, etc., and carbonate such as sodium carbonate, sodium hydrogencarbonate, potassium carbonate, etc., can be used. 0.3 to 2.5 g of foaming agent for 150 ml of water is desirable.

The foaming agent of less than 0.3 g for 150 ml of water cannot improve the deflocculation of the powder of gourd fruit. On the other hand, the foaming agent of more than 2.5 g for 150 ml of water make too much foaming and might invite overflow of the gourd powder deflocculated in water In addition to the foaming agent, in order to add the nutritious ingredients, fish powder, yeast extract, vitamins, minerals, restoratives, milk products, sugars, and bifidus factor, etc., can be mixed.

Especially, addition of the L-ascorbic acid (vitamin C) is effective for removal of the smell of the gourd. Moreover, by choice, coffee, cocoa, tea powder, deflocculating agents, sweetenings, taste correcting agents, spicery, coloring agents, preservatives, etc., can be added thereto.

The gourd powder composition of the present invention for beverage is a mixture of the powder of gourd fruit with the creaming syrup mixed by shaking mixers, etc., after mingling at an appropriate proportion and adding the above-described various additives thereto as needed.

They are formed to the slag shape or to the granule depending on the purpose of use. The high nutritious beverages are made by lightly agitating the gourd powder composition thus obtained in water or boiling water, or together with water-base beverages such as coffee, tea, cocoa, malt beverages, etc. If a foaming agent is added thereto, the cooling beverage having cream foam on the surface of the liquid like cream soda is obtained.

DETAILED DESCRIPTION OF THE PREFERRED EMBODIMENTS Test 1

The grassy-smelling of the gourd, stickiness to teeth or teethridges, and acidity of L-ascorbic acid were tested in the gourd powder food of the present invention for evaluation. Preparation of materials to be tested The designated quantities of the powder of gourd fruit and L-ascorbic acid were mixed, and 400 g of saccharose and lactose as the weight adjusting agents were added thereto to be a total weight of 990 g. These mixture was, then, mixed with Quickneeder (K-250, Daiwa Kako KK.) for 5 minutes, and then 10 g of magnesium stearate was added thereto and further mixed for one minute. This mixture was made to tablets containing 2.5 g of the mixture per each, using a tablet machine to obtain materials to be tested.

The effects were organoleptically evaluated by ten panelists. The results thus obtained are shown in Tables 1—1 and 1-2. In the Tables, "O" represents the case where all panelists thought it pleasant to eat. "□" represents the case where one to three panelists thought it unpleasant to eat (for being grassy-smelling, sour or sticky). "Δ" represents the case where four to five panelists thought it unpleasant to eat. Finally, "X" shows the case where more than eight panelists thought it unpleasant to eat.

TABLE 1-1

| | MATERIAL NO. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| COMPOSITION (%) | | | | | | | | | | | | |
| Gourd powder | 10 | 10 | 10 | 10 | 10 | 10 | 10 | 10 | 20 | 20 | 20 | 20 |
| L-Ascorbic acid | 5 | 7 | 8 | 10 | 20 | 25 | 30 | 35 | 10 | 14 | 16 | 20 |
| Lactose | 44 | 42 | 41 | 39 | 29 | 24 | 19 | 14 | 29 | 25 | 23 | 19 |
| TEST RESULTS | | | | | | | | | | | | |
| Grassy-smelling | X | Δ | □ | O | O | O | O | O | X | Δ | □ | O |
| Acidity | O | O | O | O | O | O | □ | Δ | O | O | O | O |
| Stickiness | Δ | Δ | □ | O | O | O | O | O | Δ | Δ | □ | □ |

TABLE 1-2

| | MATERIAL NO. | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| COMPOSITIN (%) | | | | | | | | | | | | |
| Gourd powder | 20 | 20 | 20 | 20 | 0 | 0 | 0 | 0 | 0 | 0 | 0 | 0 |
| L-Ascorbic acid | 25 | 30 | 35 | 39 | 5 | 10 | 15 | 20 | 25 | 30 | 35 | 40 |
| Lactose | 14 | 9 | 4 | 0 | 54 | 49 | 44 | 39 | 34 | 29 | 24 | 19 |
| TEST RESULTS | | | | | | | | | | | | |
| Grassy-smelling | O | O | O | O | O | O | O | O | O | O | O | O |
| Acidity | O | □ | Δ | X | O | O | □ | Δ | X | X | X | X |
| Stickiness | O | O | O | O | O | O | O | O | O | O | O | O |

Test 2

Stability of the L-ascorbic acid in the powder of gourd fruit of the present invention was studied using the following four materials to be tested.

test materials prepared in the same manner as the gourd powder food of test material no.5 in Test 1 (thereafter called "A").

Test materials prepared by removing the powder of gourd fruit form "A" and adding lactose instead thereof (called "B").

Test materials prepared in the same manner as the gourd powder food of test materials no.13 in Test 1 (thereafter called "C").

Test materials prepared by removing the powder of gourd fruit form "C" and adding lactose instead thereof (called "D"). Preparation of test materials Each material was put into a polyethylene bottle, just after being made (about 1.5 % weight reduction due to drying), after being dried with silica gel for eight hours (about 0.8% weight reduction due to drying), or after being dried with silica gel for twenty four hours (about 0.2% weight reduction due to drying), respectively, to be stored in a thermostat at 40° C. for three months: Then, L-ascorbic acid was compared quantitatively after one month and three months respectively. The quantitative test was made according to the Iodometry Method in the Japanese Pharmacopoeia. The results thus obtained are shown in Table 2.

TABLE 2

| | Weight reduction due to drying at start of tests (%) | Residual rate (%) | |
|---|---|---|---|
| | | Duration of storage 1 month | Duration of storage 3 months |
| A | 1.6 | 97.9 | 91.5 |
| | 0.9 | 98.5 | 95.3 |
| | 0.1 | 99.9 | 100.3 |
| B | 1.4 | 94.5 | 84.1 |
| | 0.8 | 97.0 | 92.7 |
| | 0.2 | 100.2 | 99.3 |
| C | 1.4 | 98.3 | 92.8 |
| | 0.9 | 99.8 | 96.6 |
| | 0.2 | 100.0 | 100.1 |
| D | 1.5 | 93.5 | 85.2 |
| | 0.7 | 97.9 | 95.1 |
| | 0.1 | 100.1 | 100.3 |

It is evident from Table 1 and 2 that, in the gourd powder food of the present invention, if the ratio of L-ascorbic acid to the powder of gourd fruit is more than 0.8 to 1 in weight and is less than 30% of the total weight of the mixture, the grassy-smelling peculiar to the gourd is masked and the stickiness to teeth or teethridges is depressed, and, further, the strong acid taste due to L-ascorbic acid is masked and the stability of L-ascorbic acid in water is restored. Therefore, the gourd powder food of the present invention has a good taste having a stability for a long period of time.

EXAMPLE 1

100 g of the powder of gourd fruit, 70 g of fleas, powder of finely ground glutinous rice, 619.75 g of saccharose, 0.25 g of stevioside and 200 g of L-ascorbic acid were mixed in the Quickneeder for three minutes, and, then, 60 g of water was added thereto and agitated for two minutes. The mixture thereof was dried at 55° C. for two hours. After leaving it cooled, the granule for tablets was made by sieving through a 12-mesh-screen.

After adding 10 g of magnesium stearate to the granule thus obtained and mixing thereof, tablets containing 3 g per each were made with the tablet machine. This tablet had a soft taste easily taken without the grassy-smell peculiar to the gourd and without sticky properties.

EXAMPLE 2

250 g of the powder of gourd fruit, 250 g of L-ascorbic acid, 304.7 g of mannitol, 150 g of taurine, 35 g of gum arabic powder, and 0.3 g of stevioside were mixed in the Quickneeder for three minutes, and then, 50 g of water was added thereto and agitated for two minutes. Then, mixture was dried for two hours at 55° C. After leaving it cooled, the granule for tablets was made by sieving through a 12-mesh screen. After adding 10 g of magnesium stearate to the granule and mixing thereof, tablets containing 250 mg per each were made with the tablet machine. This tablet had a soft taste easily taken without the grassy-smell peculiar to the gourd and without sticky properties.

Next, deflocculation of the powder of gourd fruit composition of the present invention in water-base beverages is described.

Test 3

Eight kinds of natural non-water-soluble food fibers, i.e., unbleached gourd powder, apple fiber, corn fiber, bran powder, crystal cellulose, carrot powder, pumpkin powder and soybean flour, were used. As creaming syrup, the corn syrup powder was used.

Each test material was prepared by mixing 20 g of food fiber with 20 g of sugar and 60 g of creaming syrup (corn syrup) in the mortar.

5 g of each test material was taken into a 100 cc-measuring cylinder and 80 cc of boiling water was added thereto and sealed up. The mixture was then agitated and left at room temperature for 24 hours. Then the precipitation and the deflocculation were measured and evaluated. The mixture of 1 g of the gourd powder and 1 g of sugar was used as a control.

Flocculation percentage = $(b/a) \times 100$ a = total quantity (ml) of water-base beverage
b = quantity (ml) obtained by deducting the precipitated quantity (ml) from "a".

The results thus obtained are shown in Table 3.

TABLE 3

| | Precipitated quantity (g) | Deflocculation percentage (%) |
|---|---|---|
| Unbleached gourd powder | 0.0 | 0.0 |
| Apple fiber | 0.8 | 77.0 |
| Corn fiber | 1.1 | 85.9 |
| Bran powder | 0.8 | 88.9 |
| Crystal cellulose | 1.1 | 85.9 |
| Carrot powder | 0.7 | 86.7 |
| Pumpkin powder | 0.8 | 77.0 |
| Soybean flour | 0.8 | 88.9 |
| Control | 0.5 | 62.2 |

It is evident from Table 3 that the unbleached gourd powder was deflocculated in water-base beverages better than other food fibers.

Test 4

Whole milk powder (71% skim solid milk, 25% milk fat) was used as an animal creaming syrup. The corn syrup (powder) was used as a vegetable creaming syrup.

The designated quantity of the powder of gourd fruit was measured and fully mixed with creaming syrup at a predetermined ratio in the mortar.

5 g of each material was taken into a 100 cc-centrifugation tube and 80 cc of boiling water was added and then sealed up. The mixture was agitated and left at room temperature for 24 hours. Then the precipitated quantity was measured for evaluation. At the same time, the taste of the deflocculated liquid was evaluated by panelists organoleptically.

The results thus obtained are shown in Tables 4-1 to 4-4. In the Tables, the mixing percentage represents the quantity of the powder of gourd fruit contained in the whole gourd powder composition.

"O" represents the case where all panelists thought it pleasant to drink.

"□" represents the case where one to three panelists thought it unpleasant to drink. "Δ" represents the case where four to seven panelists thought it unpleasant to drink. "X" represents the case where more than eight panelists thought it unpleasant to drink.

TABLE 4

| | Test material no. | | | |
|---|---|---|---|---|
| | 1 | 2 | 3 | 4 |
| Gourd powder (weight parts) | 0.1 | 0.5 | 0.7 | 1.0 |
| Whole milk powder (weight parts) | 1.0 | 1.0 | 1.0 | 1.0 |
| Mixing percentage (%) | 9.1 | 33.1 | 41.2 | 50.0 |
| Precipitated quantity (g) | 0.0 | 0.0 | 0.0 | 0.0 |
| Taste | O | O | O | O |

TABLE 4-2

| | Test material no. | | | |
|---|---|---|---|---|
| | 5 | 6 | 7 | 8 |
| Gourd powder (weight parts) | 1.1 | 1.2 | 1.3 | 1.5 |
| Whole milk powder (weight parts) | 1.0 | 1.0 | 1.0 | 1.0 |
| Mixing percentage (%) | 52.4 | 54.5 | 56.5 | 60.0 |
| Precipitated quantity (g) | 0.0 | 0.3 | 0.7 | 1.1 |
| Taste | □ | Δ | X | X |

TABLE 4-3

| | Test material no. | | | |
|---|---|---|---|---|
| | 9 | 10 | 11 | 12 |
| Gourd powder (weight parts) | 0.1 | 0.5 | 0.8 | 1.0 |
| Corn syrup (weight parts) | 1.0 | 1.0 | 1.0 | 1.0 |
| Mixing percentage (%) | 9.1 | 33.3 | 44.4 | 50.0 |
| Precipitated quantity (g) | 0.0 | 0.0 | 0.0 | 0.0 |
| Taste | O | O | O | O |

TABLE 4-4

| | Test mateial no. | | | |
|---|---|---|---|---|
| | 13 | 14 | 15 | 16 |
| Gourd powder (weight parts) | 1.1 | 1.2 | 1.3 | 1.5 |
| Corn syrup (weight parts) | 1.0 | 1.0 | 1.0 | 1.0 |
| Mixing percentage (%) | 52.4 | 54.5 | 56.5 | 60.0 |
| Precipitated quantity (g) | 0.0 | 0.2 | 0.6 | 1.1 |
| Taste | □ | Δ | X | X |

It is evident from Tables 4-1 to 4-4 that if the ratio of addition of the powder of gourd fruit to creaming syrup is not greater than 1.1 in weight parts, the gourd powder composition is deflocculated uniformly in water-base beverages, is stable for a long period of time, and has a good taste.

Therefore, the gourd powder composition of the present invention can be taken as beverages by mixing it with water-base beverages such as coffee, tea, cocoa, boiling water, and water.

EXAMPLE 3

The gourd powder composition was made by mixing 200 g of the powder of gourd fruit with 800 g of whole milk powder (71% skim solid milk, 25% milk fat) in the mixer (Quickneeder K-250, Daiwa Kako KK.) for 5 minutes.

When 5 g of the gourd powder composition was added to 150 ml of coffee and mixed lightly, it was deflocculated uniformly and quickly and tasted good.

EXAMPLE 4

The gourd composition was made by mixing 400 g of whole milk powder (71% skim solid milk, 25% milk fat), 120 g of the powder of gourd fruit, 200 g of cocoa powder, 154.5 g of fructose, 50 g of liver hydrolyzate, 0.5 g of vitamin B2, 50 g of bone powder, and 25 g of yeast extract for 5 minutes in the mixer.

When about 200 ml of boiling water was added to about 20 g of the gourd powder composition and mixed lightly, it was deflocculated quickly and uniformly and tasted good.

EXAMPLE 5

The gourd composition was made by mixing 400 g of corn syrup powder, 400 g of the powder of gourd fruit, 200 g of reduced maltose in the mixer for 5 minutes.

When 50 g of the gourd powder composition was added to 1000 ml of cow's milk and mixed lightly, it was deflocculated quickly and uniformly. It tasted good when cooled in the refrigerator.

EXAMPLE 6

70 g of 70% (W/W) ethanol was added in agitation to 1 kg of the gourd powder composition obtained in Example 5, and further mixed in the mixer for 2 minutes. The mixture, then, was dried at 50° C. for 3 hours and sieved to make the granule of the gourd powder composition.

The gourd powder composition is superior in its handling. 2.5 g of it was added to 150 ml of coffee resulting in quick deflocculation and long stability therein.

EXAMPLE 7

300 g of a mixture of corn syrup powder and skim milk with a mixing ratio of 1 to 1, 100 g of the powder of gourd fruit, 400 g of saccharose, 10 g of malic acid, 2 g of stevia, 180 g of yogurt powder, and 8 g of magnesium stearate were mixed in the mixer for 5 minutes to make tablets containing of 5 g per each of the gourd powder composition in the form of slags using the tablet machine.

When the composition was put in 100 g of water, it was deflocculated quickly. It tasted good when drunken with ice.

Now, a test of the foaming properties of the gourd powder composition and deflocculating of the powder of gourd fruit in water is described.

As non-water-soluble powders in the test, the unbleached powder of gourd fruit, apple fiber, corn fiber, crystal cellulose, carrot powder, pumpkin powder, and potato starch were used. As creaming syrup, corn syrup powder was used.

Each test material was prepared by mixing 83.3 g of non-water-soluble powder, 150 g of creaming syrup, 220 g of foaming agent, 70 g of citric acid, 200 g of lactose, 250 g of saccharose, 2 g of silicon dioxide, and 24.7 g of saccharose fatty acid ester in the mixer (Quickneeder K-250, Daiwa Kako KK.) for about five minutes to make tablets containing 6 g per each of the mixture.

To observe the foaming properties in water, one tablet was put into 150 ml of water in a 200 ml-beaker to have it effervesce. The first maximum height of the foam (A) and the height of foam (B) raised two minutes later were measured for comparison.

The deflocculation of non-water-soluble powder was evaluated by observing the precipitating level 30 minutes later. The material which did not contain non-water-soluble powder was prepared as a control.

The results thus obtained are shown in Table 5.

TABLE 5

|  | Effervescent effects | | Deflocculation effects Precipitates |
|---|---|---|---|
|  | A (mm) | B (mm) |  |
| Unbleached gourd powder | 15 | 10 | none |
| Apple fiber | 5 | 2 | present |
| Corn fiber | 9 | 3 | present |
| Crystal cellulose | 8 | 1 | present |
| Carrot powder | 8 | 2 | present |
| Pumpkin powder | 9 | 1 | present |
| Potato starch | 5 | 1 | present |
| Control | 4 | 1 | present |

A: Maximum height of foam at the time of tablet addition
B: Height of foam two minutes later As shown in Table 5 clearly, the unbleached gourd powder is superior in the effervescent effects to other non-water-soluble powder and is well deflocculated.

Therefore, good cooling beverages can be made using the gourd composition of the present invention.

EXAMPLE 8

100 g of the unbleached powder of gourd fruit, 167 g of L-ascorbic acid, 167 g of corn syrup, 200 g of mole equivalent mixture of citric acid and sodium hydrogencarbonate, 10 g of stevioside, 201 g of saccharose, and 150 g of skim milk were mixed in the Quickneeder and then formed by a roll press (made by Freund Industrial Co., Ltd.) to plate forms. Then, the granule composition was made after sieving through a 10-mesh screen.

When 6 g of the composition was put into 150 ml of water, a cooling beverage of gourd, having cream foam on the surface of the liquid was obtained.

EXAMPLE 9

150 g of the unbleached powder of gourd fruit, 350 g of skim milk, 250 g of mole equivalent mixture of tartaric acid and sodium hydrogencarbonate, 250 g of reduced maltose, 10 g of saccharose fatty acid ester, 30 g of citric acid, and 5 g of silicon dioxide were mixed in the Quickneeder for 3 minutes to make tablets containing 6 g per each of the mixture using the tablet machine.

When one tablet was put into 150 ml of water, it became effervescent and a cooling beverage of gourd was obtained.

EXAMPLE 10

85 g of the unbleached powder of gourd fruit, 200 g of skim milk, 200 g of mole equivalent mixture of tartaric acid and sodium hydrogencarbonate, 91 g of reduced maltose, 100 g of saccharose, 1 g of vitamin B1, 167 g of taurine, 1 g of vitamin B2, 150 g of fructooligosaccharide, and 5 g of silicon dioxide were mixed in the Quickneeder for 3 minutes and the tablets of the powder of gourd fruit containing 6 g per each were made.

The addition of this tablet into 150 ml of water made the tablets effervescent and produced a cooling beverage of gourd.

EXAMPLE 11

100 g of the unbleached powder of gourd fruit, 350 g of corn syrup, 250 g of mole equivalent mixture of tartaric acid and sodium hydrogencarbonate, 250 g of reduced maltose, 10 g of stevioside, 10 g of sodium chloride, 25 g of malic acid, and 5 g of silicon dioxide were mixed in the Quickneeder and formed into plates with the roll-press to make the granule composition after sieving through 10-mesh screen.

When 6 g of the composition was put into 150 ml of water, it become effervescent and a cooling beverage of gourd having foams on the surface of the liquid was made.

What is claimed is:

1. Gourd powder composition comprising powder of gourd fruit plus L-ascorbic acid and/or a creaming syrup component such that, by weight, when L-ascorbic acid is present it is in an amount of less than 30% of the total gourd powder composition and in a ratio to the powder of gourd fruit of greater than 0.8 to 1, and when the creaming syrup is present, the powder of gourd fruit is in a ratio to the creaming syrup of not greater than 1.1 to 1.

2. Composition of claim 1 wherein the creaming syrup component is formed of animal skim milk powder or whole milk powder.

3. Composition of claim 1 wherein the creaming syrup component is formed of dried powder of vegetable fat.

4. Composition of claim 1 wherein a foaming agent is included.

5. Composition of claim 4 wherein the foaming agent is organic acid or carbonate.

6. Composition of claim 1 wherein a weight adjusting agent is included.

7. Composition of claim 1 wherein the powder of gourd fruit is a 42-mesh pass powder with an average grain diameter of more than 80-mesh.

8. Gourd powder composition comprising powder of unbleached gourd fruit and L-ascorbic acid, the L-ascorbic acid being present, by weight, in an amount of less than 30% of the total gourd powder composition and in a ratio to the powder of gourd fruit of greater than 0.8:1.

9. Composition of claim 8 wherein a weight adjusting agent is included.

10. Composition of claim 8 wherein the powder of gourd fruit is a 42-mesh pass powder with an average grain diameter of more than 80-mesh.

11. Gourd powder composition comprising powder of unbleached gourd fruit and creaming syrup, the powder of gourd fruit being present, by weight, in a ratio to the creaming syrup of not greater than 1.1:1.

12. Composition of claim 11 wherein the creaming syrup component is formed of animal skim milk powder or whole milk powder.

13. Composition of claim 11 wherein the creaming syrup component is formed of dried powder of vegetable fat.

14. Composition of claim 11 wherein the creaming syrup is corn syrup powder.

15. Composition of claim 11 wherein a foaming agent is included.

16. Composition of claim 15 wherein the foaming agent is organic acid or carbonate.

17. Composition of claim 11 wherein a weight adjusting agent is included.

18. Composition of claim 11 wherein the powder of gourd fruit is a 42mesh pass powder with an average grain diameter of more than 80-mesh.

* * * * *